Figure 1:
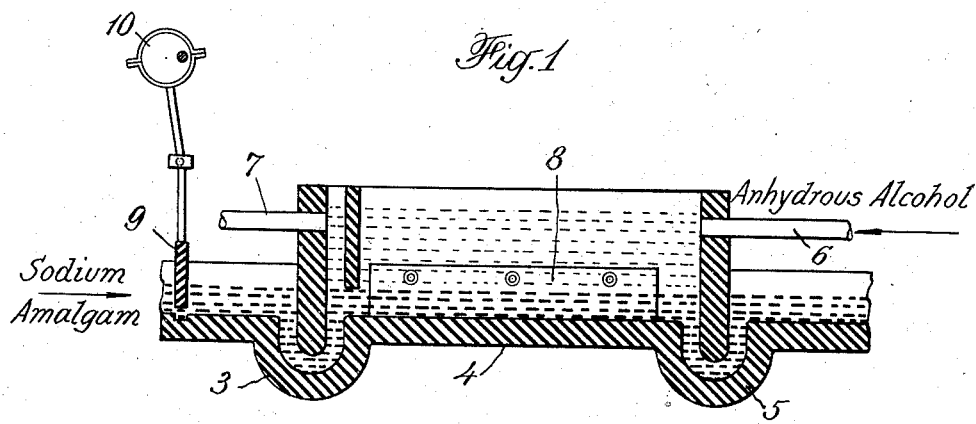

April 6, 1948.  G. L. CUNNINGHAM ET AL  2,438,963
MANUFACTURE OF ALKALI METAL ALCOHOLATES
Filed Oct. 17, 1942

INVENTORS
George Lewis Cunningham
Richard Sewall Robinson
BY
ATTORNEYS

Patented Apr. 6, 1948

2,438,963

UNITED STATES PATENT OFFICE 2,438,963

MANUFACTURE OF ALKALI METAL ALCOHOLATES

George Lewis Cunningham and Richard Sewall Robinson, Niagara Falls, N. Y., assignors to The Mathieson Alkali Works, Inc., New York, N. Y., a corporation of Virginia Application October 17, 1942, Serial No. 462,404

5 Claims. (Cl. 204—72)

This invention is concerned with improvements in the manufacture of alkali metal alcoholates and in one aspect, is an improvement in the process described in Letters Patent No. 2,069,403, granted February 2, 1937. One of us has there described the production of alkali metal alcoholates by reacting an anhydrous alcohol having no more than four carbon atoms with the corresponding alkali metal amalgam in the presence of an electrically conducting non-amalgamating electrode in contact with the amalgam and the alcohol to form the corresponding alkali metal alcoholate. The present invention brings about a great improvement in the rate of such a reaction and increases the period of useful activity of the electrode employed in the process.

This application is a continuation-in-part of our co-pending application Serial No. 300,940, filed October 24, 1939, now abandoned.

In forming an alkali metal alcoholate by reacting an anhydrous alcohol having four carbon atoms or less with alkali metal amalgam in the presence of an electrically conducting non-amalgamating electrode in contact with the amalgam and the alcohol, a large proportion of the amalgam decomposition and the resulting formation of the alcoholate occurs at the junction of the three phases present—the alcohol and the amalgam as two liquid phases and the electrode as a solid phase. Attempts to increase the reaction rate by increasing the size of the junction of the three phases, for example by increasing the amount of electrode surface available, have been unsuccessful. Thus, the increase in the electrode area through the use of very thin elements is impracticable because it results in the formation of a fragile structure. Graphite, one of the best materials for decomposition electrodes, is too fragile to be put to practical use in very thin sections. Moreover, increase in electrode surface seriously interferes with proper flow of amalgam through the decomposition cell, so that even when thin metal electrodes are employed, the operation is not successful.

As the result of our investigations, we have found that we can obtain all of the advantages of increased electrode surfaces, with none of the disadvantages, by cyclically moving the electrode transversely through the interface between the amalgam and the alcohol as the reaction continues, the electrode being held in the alcohol for not less than about one-fifth of the cycle time. This brings about a marked increase in the rate of reaction between the alcohol and the alkali metal of the amalgam and permits the use of electrodes which are adequately strong and which do not seriously interfere with amalgam flow through the decomposition cell. The increase in the rate of reaction in terms of the amount of electrode surface available is tremendous and may be as much as 500% or more.

An additional advantage accrues to the practice of our invention in that the period of useful activity of the decomposition electrodes is increased markedly.

The motion of the electrode transversely through the interface between the alcohol and the amalgam may be substantially continuous or intermittent, providing that in either case the working surface of the electrode is maintained in the alcohol for not less than about one-fifth of the cycle time. Thus, the working surface of the electrode may be immersed in the amalgam for periods of time up to four times as great as the period of contact of the working surface with the alcohol. In our preferred operation, the working surface of the electrode is immersed in the amalgam for a period of time approximately equalling the preceding period of time in which this surface has been immersed in the alcohol, but the period of immersion of the working surface of the electrode in the amalgam may be increased as indicated above, for example the working surface of the electrode may be immersed in the amalgam for successive periods of 120 seconds after being in contact with the alcohol for alternating periods of not less than 30 seconds each. In other words, the electrode is in contact with the alcohol from 20 to 50 percent of the cycle time.

Although we do not predicate our invention upon any particular hypothesis, it appears that the great increase in reaction rate does not result from agitation caused by moving the electrode transversely through the interface between the amalgam and the alcohol, for the rate of this movement may be very slow, so slow in fact that no substantial agitation occurs, as shown by the fact that there is substantially no admixture of amalgam and alcohol and in fact substantially no disturbance of the interface between them.

It is believed that the transverse movement of the electrode through the interface between the amalgam and the alcohol results in the establishment of a thin film of the alcohol between the amalgam and the electrode surface, this film being entrained on the electrode and carried by it into the body of the amalgam. In this thin film, the alcohol reacts with the amalgam to form the alkali metal alcoholate and hydrogen. The rate of solution of the alcoholate in the alcohol is rather slow and this may result in the formation of a viscous solution of the alcohol in the alcoholate in part of the film, i. e., at the interface of the film with the amalgam. It is believed that this viscous film may act as a barrier to the escape of hydrogen with the result that the hydrogen is driven into the electrode and inactivates it, unless the working surface of the electrode is withdrawn with reasonable promptness from the amalgam and given a rest period in the alcohol, which rest period should be not less than one-fifth of the entire cycle time, in order to permit diffusion of the alcoholate of the film into the main alcohol body.

As indicated above, the period of immersion of the working surface of the electrode in the alcohol may be characterized as a "rest period." Given an adequate rest period, the reaction proceeds rapidly at the working surface of the electrode during the rest of the cycle, so rapidly in fact that a five-fold increase in the over-all reaction rate is secured. Moreover, the useful life of the electrode is greatly increased and inactivation of the electrode results only after a much longer working period.

Figure 2:
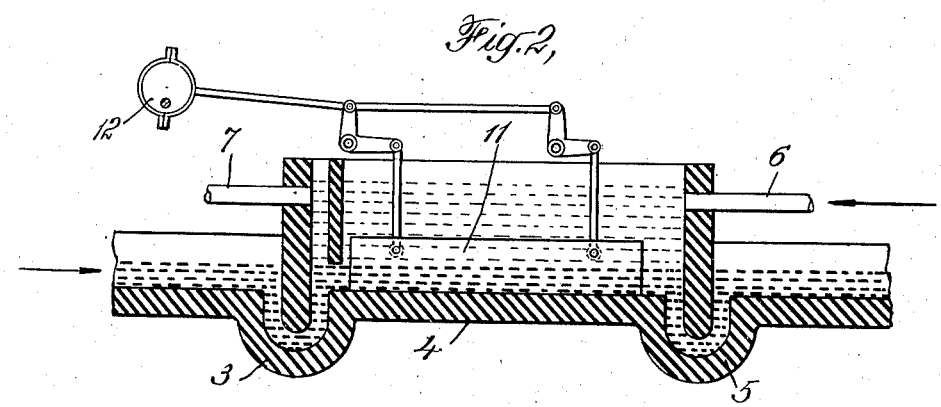
Figure 3:
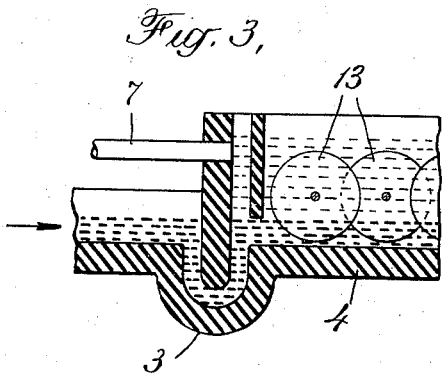
Figure 4:
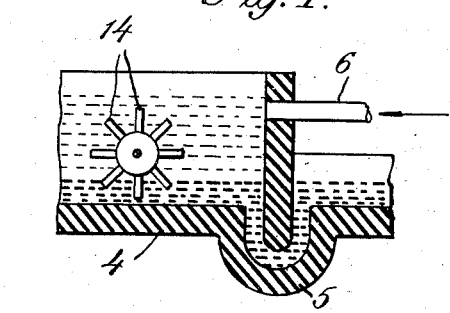

We have illustrated in the accompanying drawings four forms of apparatus appropriate for practicing our invention in which four different forms of decomposition cells are diagrammed in fragmentary sectional elevation, one in Fig. 1, another in Fig. 2, and a third and fourth in Figs. 3 and 4.

In the apparatus illustrated in Fig. 1, fresh sodium amalgam, from a mercury cathode electrolytic cell in which sodium chloride is decomposed for example, is supplied through trough 3, the amalgam flows over the floor of the cell 4, and the spent amalgam is discharged through trough 5 while anhydrous ethyl alcohol, for example, is supplied through connection 6 and a solution of sodium ethylate in ethyl alcohol is discharged through connection 7. The decomposition electrode 8 may be constructed of any of the materials described in the Letters Patent previously mentioned. In this cell, the motion of the decomposition electrode through the interface between the alcohol and the amalgam in the cell proper is effected by alternately raising and lowering the level of the amalgam in the cell by periodically interrupting the flow of amalgam to the cell by operation of the gate 9 by rotation of eccentric 10.

In the apparatus illustrated in Fig. 2, the motion of the decomposition electrode through the interface between the alcohol and the amalgam is effected by alternately raising and lowering the decomposition electrode instead of by raising and lowering the level of the amalgam in the cell. This motion is imparted to the electrode 11 by rotation of the eccentric 12 through appropriate linkage. This cell otherwise corresponds to that illustrated in Fig. 1 and the same parts are designated by the same reference characters.

The motion of the electrode through the interface between the alcohol and the amalgam in the apparatus illustrated in Figs. 1 and 2 may be substantially continuous, or it may be intermittent. The periods of immersion in the amalgam of the working surface of the electrode may approximately equal the periods of contact between this working surface and the alcohol or the motion may be so regulated that the periods of immersion in the amalgam exceed in duration the periods of contact with the alcohol, provided that the period of immersion in the amalgam is not more than about four times the duration of immersion in the alcohol. For example, the working surface of the decomposition electrode may be immersed in the amalgam for successive periods of 120 seconds after being in contact with the alcohol for alternating periods of 30 seconds.

In the apparatus illustrated in Fig. 3, the motion of the decomposition electrode through the interface between the alcohol and the amalgam is effected by revolving the shafts carrying the graphite discs 13. In the apparatus illustrated in Fig. 4, this motion is effected by revolving the wheels carrying the graphite bars 14, these bars being arranged transversely of the amalgam flow.

The alcohol solution of alcoholate in the cell may be maintained, for example, at a temperature in the general range of 25°–95° C. Temperatures up to the boiling point of the solution are useful. Higher temperatures within this range further expedite the reaction.

Making the comparsion in the same decomposition cell, with the decomposition electrode stationary in one case and moving the decomposition electrode through the interface between the alcohol and the amalgam in accordance with our invention in the other case, the periods of immersion in the alcohol and in the amalgam being approximately equal, we have attained decomposition rates as measured by the rate of discharge of the amalgam approximately five times as great in the second case as in the first.

We claim:

1. In the manufacture of alkali metal alcoholates involving the reaction of an anhydrous alcohol having from one to four carbon atoms and an alkali metal amalgam in the presence of an electrically conducting non-amalgamating electrode in contact with the alcohol and amalgam, the improvement which comprises cyclically causing relative movement between the electrode and the interface between the alcohol and the subjacent amalgam, said relative movement being transversely through the interface and without substantial agitation or circulation of the amalgam, any particular point on the working surface of said electrode being successively in contact with the amalgam and the alcohol, with its contact with the alcohol being from 20 per cent to 50 per cent of the cycle time.

2. In the manufacture of alkali metal alcoholates as set forth in claim 1, the further improvements in which the cycle is about 150 seconds.

3. In the manufacture of alkali metal alcoholates as set forth in claim 1, the further improvement in which the electrode is moved transversely through the interface between the alcohol and the subjacent amalgam.

4. In the manufacture of alkali metal alcoholates as set forth in claim 1, the further improvement in which the electrode is a rotating one and at any time during operation is only partly submerged in the amalgam.

5. In the manufacture of alkali metal alcoholates as set forth in claim 1, the further improvement in which the relative movement between the electrode and the interface between the alcohol and the subjacent amalgam is caused by raising and lowering the horizontal level of said interface.

GEORGE LEWIS CUNNINGHAM.
RICHARD SEWALL ROBINSON.

REFERENCES CITED

The following references are of record in the file of this patent:

UNITED STATES PATENTS

| Number | Name | Date |
|---|---|---|
| 709,971 | Edser et al. | Sept. 30, 1902 |
| 790,922 | Roepper et al. | May 30, 1905 |
| 877,537 | Whiting | Jan. 28, 1908 |
| 1,532,489 | Heinze | Apr. 7, 1925 |
| 1,784,066 | Heinze | Dec. 9, 1930 |
| 2,232,128 | Muller | Feb. 18, 1941 |
| 2,069,403 | Cunningham | Feb. 2, 1937 |